(12) United States Patent
Vasudeva et al.

(10) Patent No.: US 6,431,801 B2
(45) Date of Patent: Aug. 13, 2002

(54) DRILL BIT FOR NON-LINEAR DRILLING

(75) Inventors: Kailash C. Vasudeva, Waterloo; Maz A. Hasan, Kitchener, both of (CA)

(73) Assignee: Maxtech Manufacturing Inc., Waterloo (CA)

( * ) Notice: Subject to any disclaimer, the term of this patent is extended or adjusted under 35 U.S.C. 154(b) by 0 days.

(21) Appl. No.: 09/731,824

(22) Filed: Dec. 8, 2000

Related U.S. Application Data

(60) Provisional application No. 60/169,928, filed on Dec. 10, 1999.

(51) Int. Cl.$^7$ .............................................. B23B 51/02
(52) U.S. Cl. ...................... 408/211; 408/225; 408/227
(58) Field of Search ............................ 408/22, 24, 93, 408/211, 213, 223, 224, 225, 226, 230, 227; 407/31, 54, 53, 59

(56) References Cited

U.S. PATENT DOCUMENTS

| | | | | |
|---|---|---|---|---|
| 1,964,030 A | * | 6/1934 | Brush | 255/63 |
| 3,736,634 A | * | 6/1973 | Sonnie | 29/103 A |
| 4,167,363 A | * | 9/1979 | Whitesel | 408/201 |
| 4,285,618 A | * | 8/1981 | Shanley, Jr. | 407/54 |
| 4,753,558 A | * | 6/1988 | Jansson | 408/212 |
| 5,122,134 A | * | 6/1992 | Borzone et al. | 606/80 |
| 5,842,267 A | * | 12/1998 | Biederman et al. | 29/558 |
| 5,895,179 A | * | 4/1999 | Gschwend et al. | 408/226 |
| 5,967,712 A | * | 10/1999 | Magill et al. | 408/227 |
| 5,980,169 A | * | 11/1999 | Hinch | 408/225 |
| 6,164,876 A | * | 12/2000 | Cordovano | 407/59 |
| 6,190,097 B1 | * | 2/2001 | Thomas | 408/230 |
| 6,227,774 B1 | * | 5/2001 | Haughton et al. | 408/225 |

FOREIGN PATENT DOCUMENTS

DE    2212091 A   *   7/1989

OTHER PUBLICATIONS

Printout of Internet pages "3D–bit", 3D–borr AB, Sweden (7 pages).

* cited by examiner

*Primary Examiner*—Henry Tsai
(74) *Attorney, Agent, or Firm*—R. Craig Armstrong

(57) ABSTRACT

A drill bit for boring non-linear holes in a workpiece, the drill bit having a generally elongate post, for mounting the drill bit to a tool; a generally elongate shank; and a head. The head has a front portion, a rear portion and there between a main body portion. A plurality of flutes are arranged in a generally helical shape along the main body portion, arched with respect to a longitudinal direction of the drill bit, each flute having an outer cutting edge arranged on an outside edge of the flute, to provide cutting capability in a direction substantially sideways compared to the longitudinal direction of the drill bit. A central point, arranged on the front portion of the head, is connected to at least one flute via a tapered first cutting portion, the first cutting portion being provided with a first cutting edge, to provide cutting capability in a direction substantially forwards. A forward facing roughing part is arranged on at least one flute and on the front portion of the head, the roughing part having a roughing edge, to provide further cutting capability in a direction substantially forwards. The rear portion of the head is connected to at least one flute via a tapered second cutting portion, the second cutting portion being provided with a second cutting edge, to provide cutting capability in a direction substantially rearwards.

13 Claims, 8 Drawing Sheets

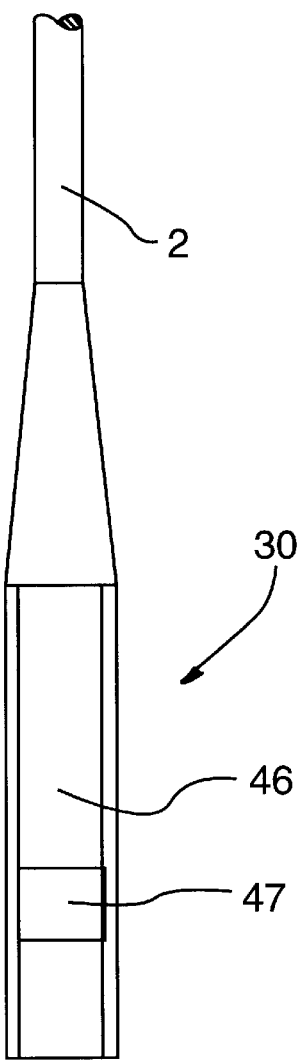
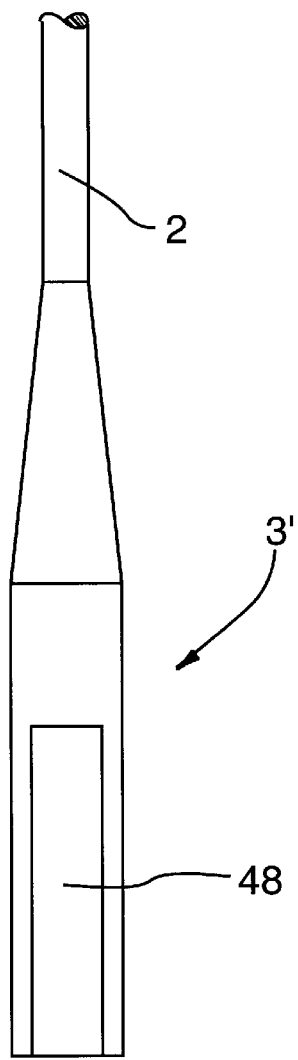
FIG.6A
FIG.7A
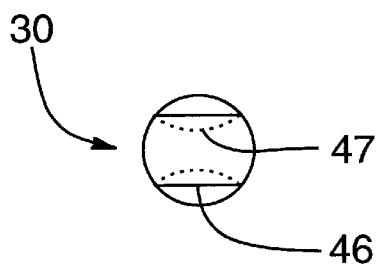
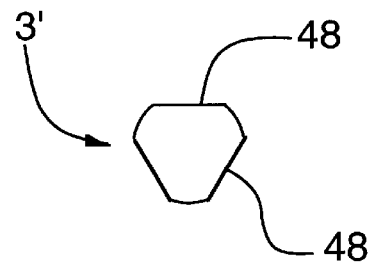
FIG.6B
FIG.7B

DRILL BIT FOR NON-LINEAR DRILLING

REFERENCE TO RELATED APPLICATION

This is a formal application based on and claiming the benefit of U.S. provisional patent application No. 60/169,928, filed Dec. 10, 1999.

BACKGROUND OF THE INVENTION

1. Field of the Invention

This invention relates to a drill bit having a drill head for cutting a hole in a direction forward from the drill head, sideways from the drill head and backwards from the drill head.

2. Description of the Prior Art

Drill bits for making non-linear holes are known, for example sold under the trade name "3D BORRET", having an elongated shaft with a tool mount at a proximal end of the shaft and a drill head at the distal end of the shaft. The drill head has a plurality of flutes, which have a substantially straight front cutting edge substantially perpendicular to a longitudinal axis of the shaft. Further, the flutes have outer cutting edges, for cutting substantially perpendicularly to the shaft axis. Perceived disadvantages of this drill bit are the relative difficulty in machining the drilled hole in a rearward direction, with the forward direction being the initial drilling direction, and the relatively poor chip removal characteristics of the drill bit, caused by its flutes being substantially straight and parallel to the longitudinal axis of the shaft.

SUMMARY OF THE INVENTION

In the invention, a drill bit is provided which has a narrow shank, to facilitate sideways movement and tilting of a drill head in a drilled hole, without the shank making contact with the surfaces of the hole. The head is arranged on the drill bit at a distal end of the shank. The drill bit optionally has a generally elongate post arranged at a proximal end of the shank, for attaching the drill bit to a power or hand drill.

The head has a front portion, a rear portion and therebetween a main body portion. A number of flutes extend radially from the main body portion and are arranged in a helical shape. Any number of flutes may be used, but advantageously four or six flutes are used. The flutes facilitate and speed up the chip removal from the bored hole. The front portion of the head has a central point, preferably connected to each flute via a tapered, preferably triangularly shaped, front cutting portion. The point is connected to at least one flute with the aforementioned front cutting portion. Each front cutting portion is provided with a front cutting edge, to form an initial cut in a workpiece, and to provide cutting capability in a forward direction.

At the distal end of the head, and arranged on at least one, but preferably two or all of the flutes, is a forward-facing roughing edge. The forward roughing edge makes a cut along the outer periphery of the bored hole.

Each flute has an outer cutting edge arranged on its outside edge. The outer cutting edges provide cutting ability in a direction sideways from the longitudinal direction of the drill bit.

At the proximal end of the head, and arranged on at least one, but preferably two or all of the flutes, is a rearward-facing roughing edge. The rearward roughing edge makes a cut along the outer periphery of the bored hole, when the drill bit is moved backwards in the bored hole.

The rear portion of the head is connected to at least one flute via a tapered, preferably triangularly shaped, rear cutting portion. Each rear cutting portion is provided with a rear cutting edge, to provide cutting capability in a direction substantially rearwards, i.e. for making cuts back towards the entering direction of the drill bit in the bored hole.

Thus, a non-linear hole may be drilled by advancing the drill bit into the work-piece, exerting lateral pressure as desired in order for the outer cutting edges to bite into the workpiece in a desired lateral direction, and possibly retracting the drill bit in such a way as to cause the rear cutting edges to bite into the workpiece, if desired.

BRIEF DESCRIPTION OF DRAWINGS

In order that the invention may be more clearly understood, the preferred embodiment thereof will now be described in detail by way of example, with reference to the accompanying drawings, in which:

FIG. 6A is a side view of a drill bit shank and post in accordance with yet a further embodiment of the invention;

FIG. 6B is an end view of the drill bit shank and post of FIG. 6A, seen from the post end of the drill bit;

FIG. 7A is a side view of a drill bit shank and post in accordance with still a further embodiment of the invention; and FIG. 7B is an end view of the drill bit shank and post of FIG. 7A, seen from the post end of the drill bit.

DETAILED DESCRIPTION OF THE PREFERRED EMBODIMENT

Figure 1A:
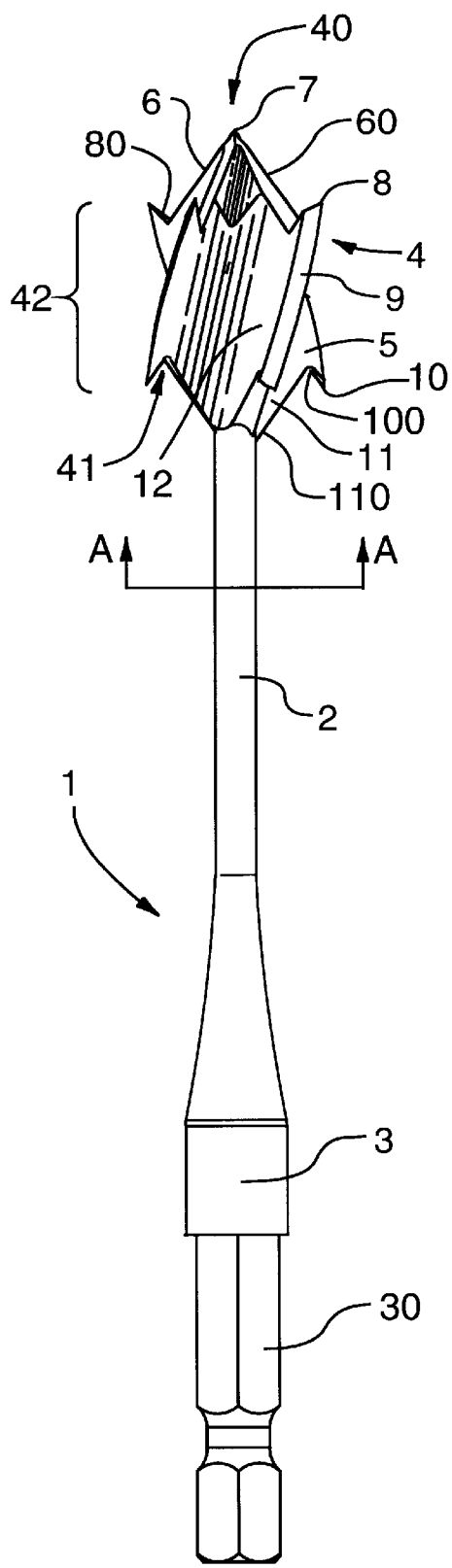
FIG. 1A is a side view of a drill bit in accordance with one embodiment of the invention.
Figure 1B:
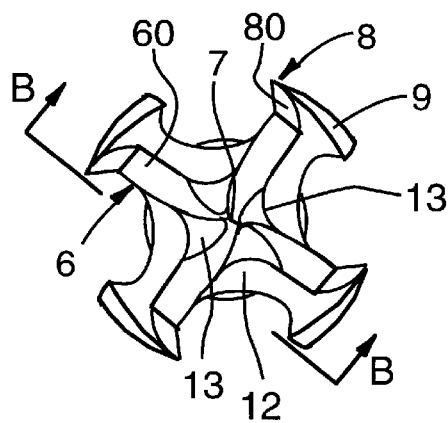
FIG. 1B is a front view of the drill bit of FIG. 1A.
Figure 1C:
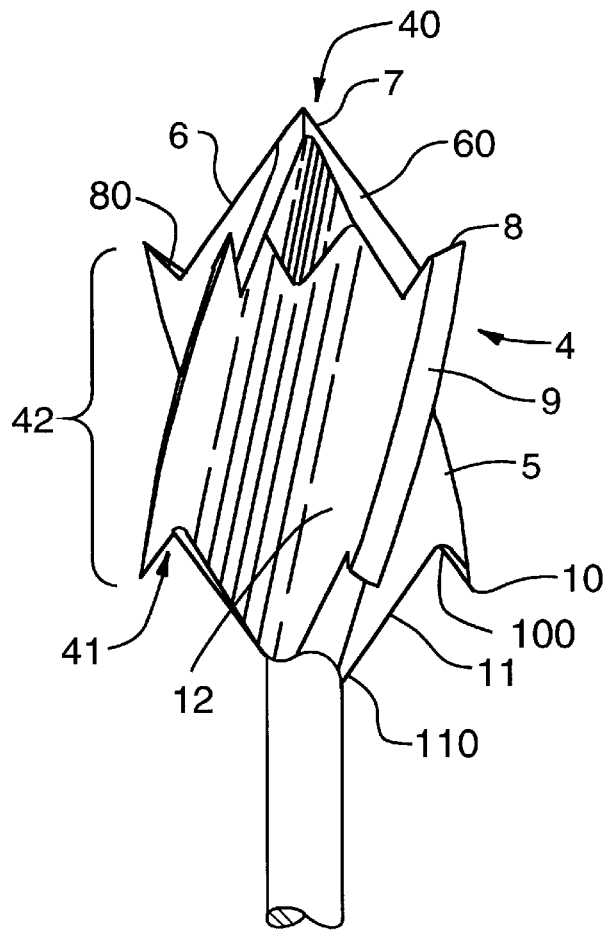
FIG. 1C is an elevational side view of a drill bit head of the drill bit of FIG. 1A.
Figure 1D:
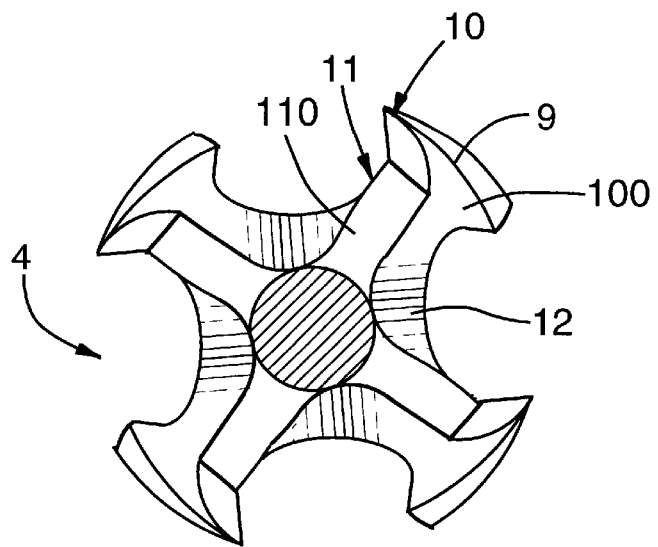
FIG. 1D is a partially sectioned view of the drill bit from line A—A of FIG. 1A.
Figure 1E:
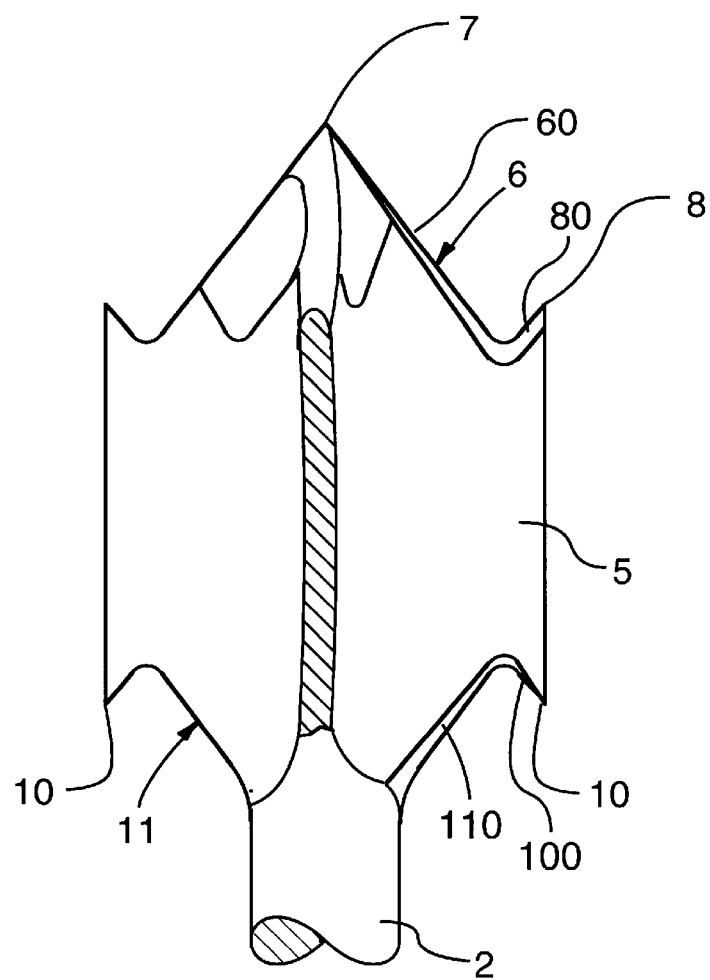
FIG. 1E is a partially sectioned view of the drill bit head from line B—B of FIG. 1A.

According to a first embodiment of the invention, as shown in FIGS. 1A to 1F, a drill bit 1 for boring either non-linear holes or linear holes in a workpiece (not shown) has a generally elongate post 3, for mounting the drill bit to a hand tool or a power tool. Advantageously, and as shown in FIGS. 1A and 4A, the post may have a standard hex mount 30, 30''' with a retaining groove, for cooperation with standard fast-mount and fast-eject chucks, or similar, on the tool. Further, the drill bit has a generally elongate shank 2 and a head 4. The shank is arranged as a continuation of the post, and the head is arranged at an end of the shank opposite the post. The head 4 has a front portion 40, a rear portion 41 and there-between a main body portion 43. The head further has a plurality of flutes 5, arranged in a generally helical shape along the shank and the main body portion, arched with respect to a longitudinal direction of the drill bit. Each flute has an outer cutting edge 9 arranged on an outside edge of each flute, to provide cutting capability in a direction substantially sideways compared to the longitudinal direction of the drill bit. The drill bit further has a central point 7, arranged on the front portion 40 of the head 4. The central point is connected to at least one of the flutes 5 via tapered front cutting portions 6, each of the front cutting portions being provided with a front cutting edge 60, to provide cutting capability in a direction substantially forwards. The taper of the front cutting portions is chosen to optimize the drill bit capability to drill both forwards and in a lateral direction. At least one of the flutes 5 further has a forward facing roughing part 8, arranged at the front portion of the head, i.e. furthest away from the post 3, the forward roughing part having a forward roughing edge 80, to provide further cutting capability in a direction substantially forwards. The rear portion 41 of the head 4 is connected to at least one of the flutes 5 via tapered rear cutting portions 11, each rear cutting portions being provided with a rear cutting edge 110, to provide cutting capability in a direction substantially rearwards. At least one of the flutes 5 further has a rearward facing roughing part 10, arranged at the rear portion of the head, i.e. closest to the post 3, the rearward roughing part having a rearward roughing edge 100, to provide further cutting capability in a direction substantially rearwards in the drilled hole.

Advantageously, the flutes 5 have generally concave fillets 12 arranged on both sides of the flute where it attaches to the shank 2, to provide enhanced chip-removal from the head 4.

Preferably, each forward facing front cutting portion 6 has generally concave fillets 13 arranged on both sides of the front cutting portion where it attaches to the shank 2, to provide further enhanced chip-removal from the head 4.

The shank 2 advantageously has a diameter which is smaller than the diameter of the post 3, to facilitate sideways movement and tilting of the head 4 in a drilled hole, without the post or the shank making contact with surfaces of the hole.

Figure 2A:
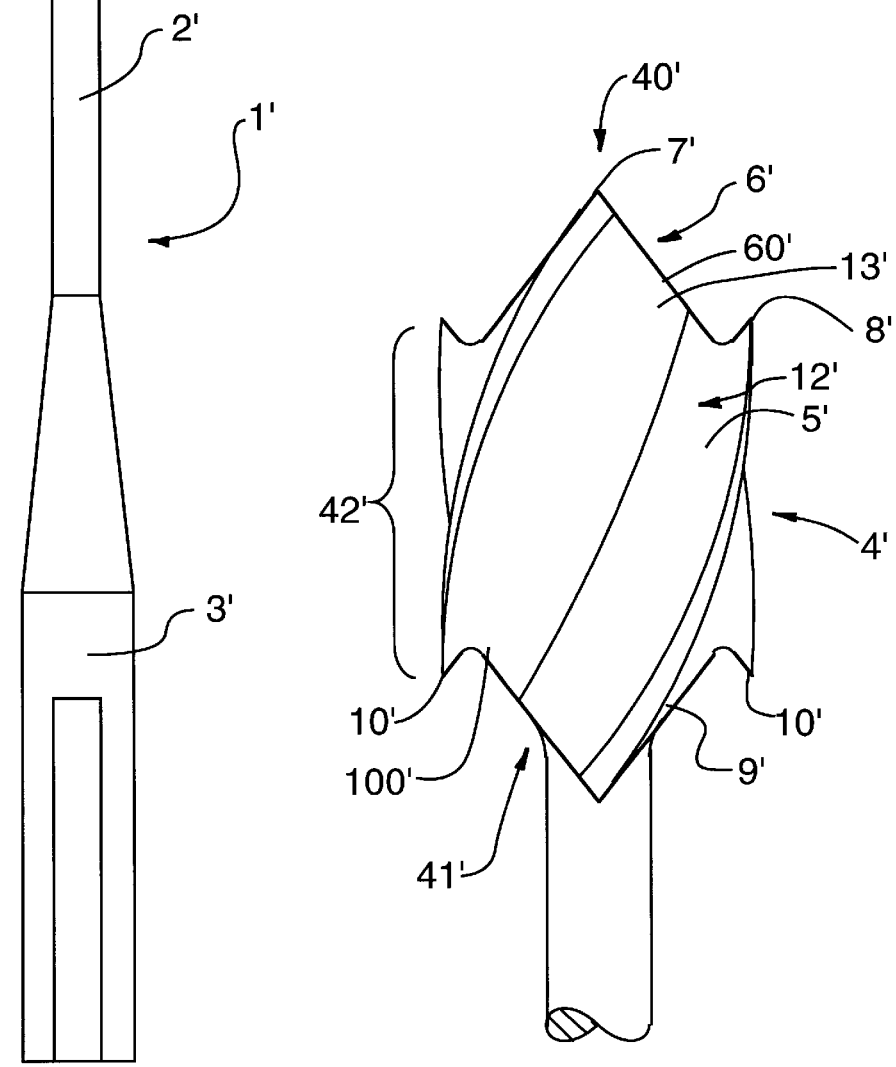
FIG. 2A is an elevational side view of a drill bit in accordance with a further embodiment of the invention.
Figure 2B:
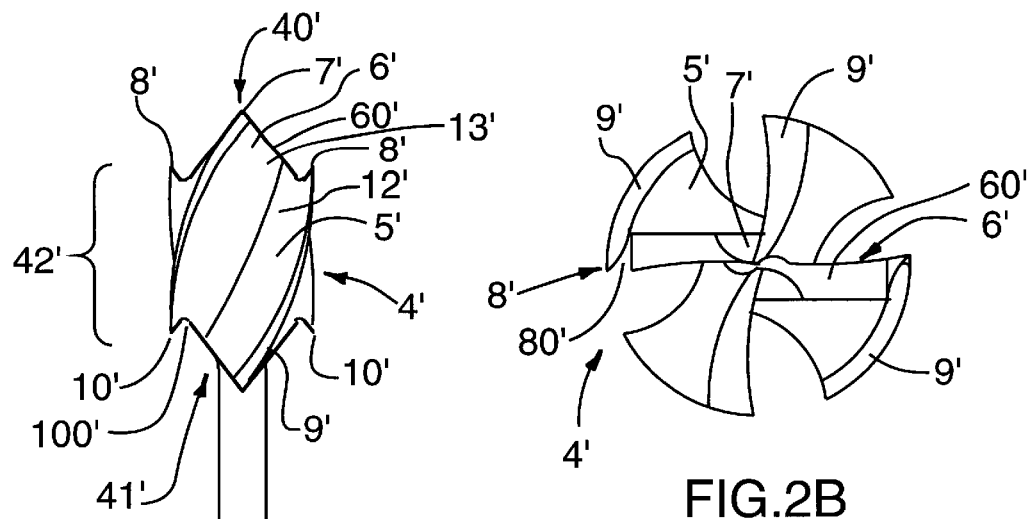
FIG. 2B is a front view of the drill bit of FIG. 2A.
Figure 2C:
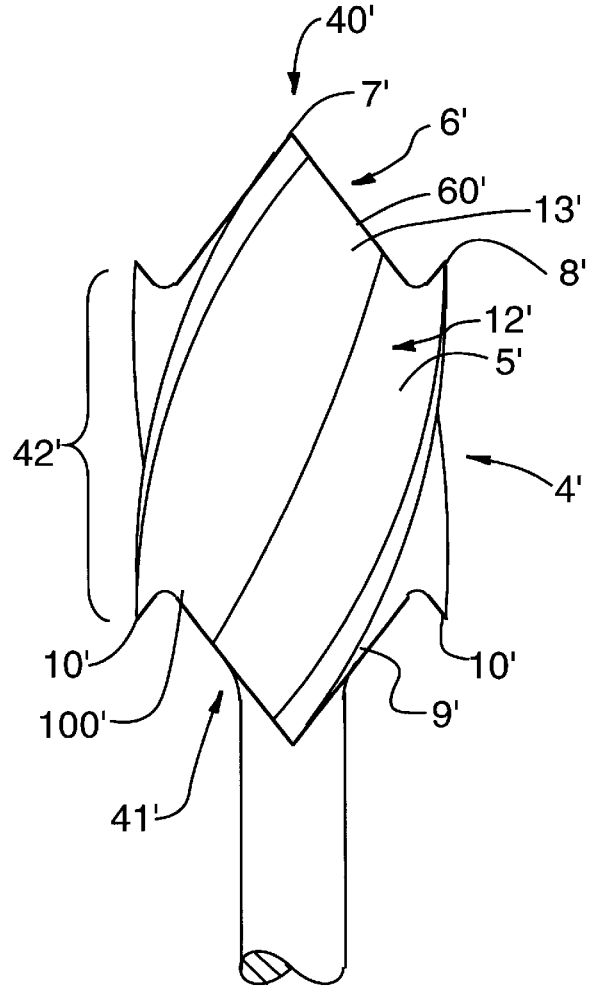
FIG. 2C is a side view of the drill bit head of FIG. 2A.

A second embodiment of the invention is shown in FIGS. 2A to 2C. A drill bit 1' for boring either non-linear holes or linear holes in a workpiece (not shown) has a generally elongate post 3', for mounting the drill bit to a hand tool or a power tool. The drill bit has a generally elongate shank 2' and a head 4'. The shank is arranged as a continuation of the post, and the head is arranged at an end of the shank opposite the post. The head 4' has a front portion 40', a rear portion 41' and there-between a main body portion 43'. The head further has a plurality of flutes 5', arranged in a generally helical shape along the shank and the main body portion, arched with respect to a longitudinal direction of the drill bit. Each flute has an outer cutting edge 9' arranged on an outside edge of each flute, to provide cutting capability in a direction substantially sideways compared to the longitudinal direction of the drill bit. The drill bit further has a central point 7', arranged on the front portion 40' of the head 4'. The central point is connected to at least one of the flutes 5' via tapered front cutting portions 6', each of the front cutting portions being provided with a front cutting edge 60', to provide cutting capability in a direction substantially forwards. The taper of the front cutting portions is chosen to optimize the drill bit capability to drill both forwards and in a lateral direction. At least one of the flutes 5' further has a forward facing roughing part 8', arranged at the front portion of the head, i.e. furthest away from the post 3', the forward roughing part having a forward roughing edge 80', to provide further cutting capability in a direction substantially forwards. The rear portion 41' of the head 4' is connected to at least one of the flutes 5', via tapered rear cutting portions 11', each rear cutting portions being provided with a rear cutting edge 110', to provide cutting capability in a direction substantially rearwards. At least one of the flutes 5' further has a rearward facing roughing part 10', arranged at the rear portion of the head, i.e. closest to the post 3', the rearward roughing part having a rearward roughing edge 100', to provide further cutting capability in a direction substantially rearwards in the drilled hole. The flutes which have no forward roughing part 8' are arranged to run with their outer edge 9' all the way to the central point 7', thus having no forward cutting portion 6'. The flutes which have no rearward roughing part 10' are arranged to run with their outer edge 9' all the way to the rear portion 41' of the head 4, where the shank 2' and the head joins, thus having no rearward cutting portion 11'.

Figure 3B:
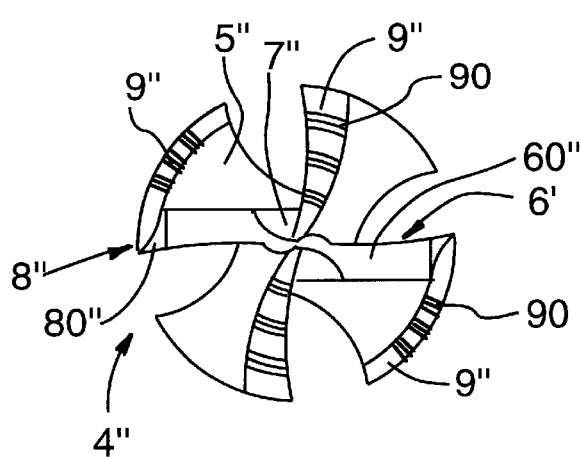
FIG. 3B is a front view of the drill bit of FIG. 3A.
Figure 3A:
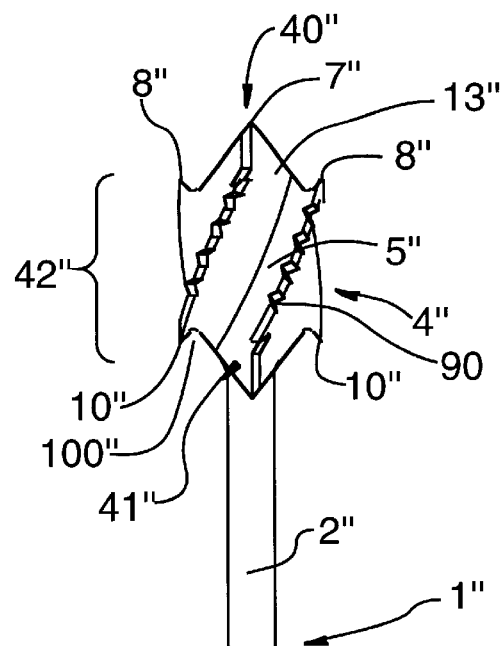
FIG. 3A is an elevational side view of a drill bit in accordance with a still further embodiment of the invention.
Figure 3C:
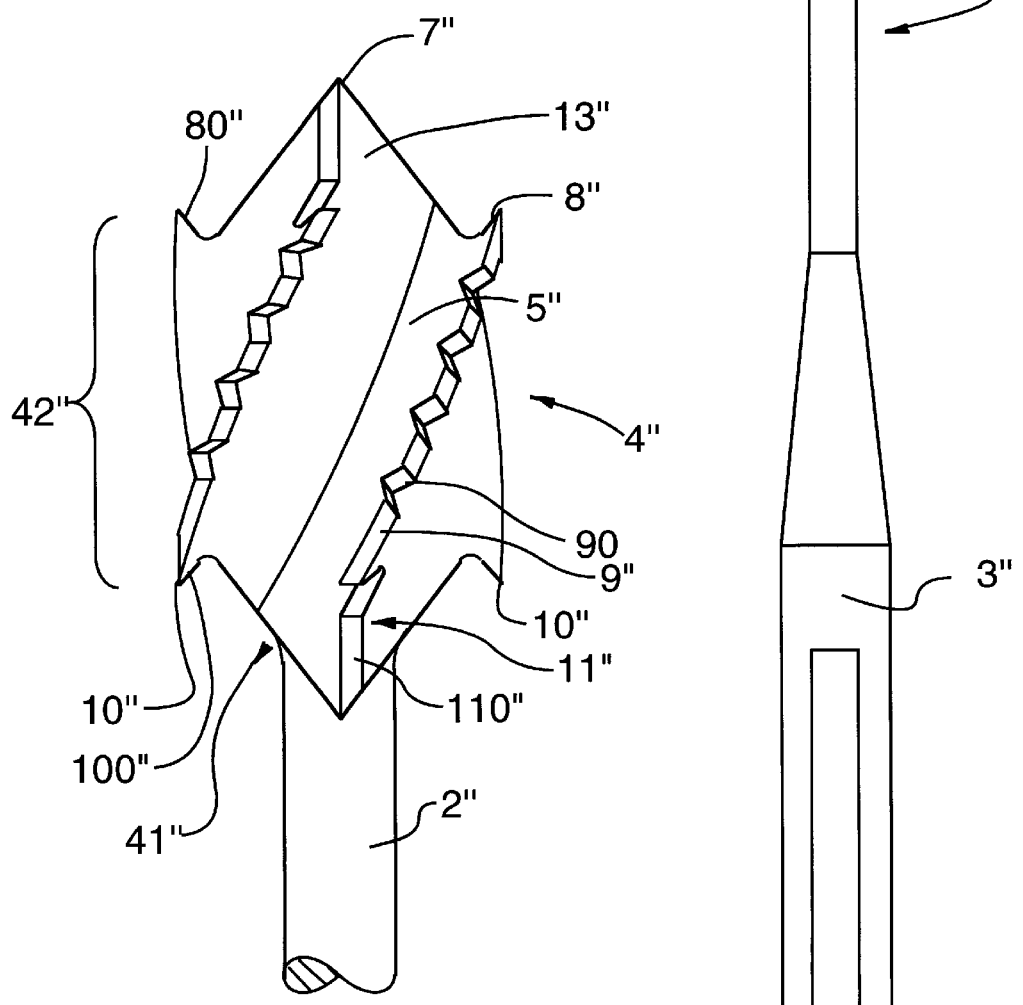
FIG. 3C is a side view of the drill bit head of FIG. 3A.

A third embodiment of the invention is shown in FIGS. 3A to 3C. A drill bit 1" for boring either non-linear holes or linear holes in a workpiece (not shown) has a generally elongate post 3", for mounting the drill bit to a hand tool or a power tool. The drill bit has a generally elongate shank 2" and a head 4". The shank is arranged as a continuation of the post, and the head is arranged at an end of the shank opposite the post. The head 4" has a front portion 40", a rear portion 41" and there-between a main body portion 43". The head further has a plurality of flutes 5", arranged in a generally helical shape along the shank and the main body portion, arched with respect to a longitudinal direction of the drill bit. Each flute has an outer cutting edge 9" arranged on an outside edge of each flute, to provide cutting capability in a direction substantially sideways compared to the longitudinal direction of the drill bit. The outer cutting edge preferably has serrations 90 arranged along at least a portion of the length of the outer cutting edge, to enhance the cutting capability of the drill bit in the lateral direction. The drill bit further has a central point 7", arranged on the front portion 40" of the head 4". The central point is connected to at least one of the flutes 5" via tapered front cutting portions 6", each of the front cutting portions being provided with a front cutting edge 60", to provide cutting capability in a direction substantially forwards. The taper of the front cutting portions is chosen to optimize the drill bit capability to drill both forwards and in a lateral direction. At least one of the flutes 5" further has a forward facing roughing part 8", arranged at the front portion of the head, i.e. furthest away from the post 3", the forward roughing part having a forward roughing edge 80", to provide further cutting capability in a direction substantially forwards. The rear portion 41" of the head 4" is connected to at least one of the flutes 5" via tapered rear cutting portions 11", each rear cutting portions being provided with a rear cutting edge 110", to provide cutting capability in a direction substantially rearwards. At least one of the flutes 5" further has a rearward facing roughing part 10", arranged at the rear portion of the head, i.e. closest to the post 3", the rearward roughing part having a rearward roughing edge 100", to provide further cutting capability in a direction substantially rearwards in the drilled hole. The flutes which have no forward roughing part 8" are arranged to run with their outer edge 9" all the way to the central point 7", thus having no forward cutting portion 6".

Advantageously, the flutes 5" have generally concave fillets 12" arranged on both sides of the flute where it attaches to the shank 2", to provide enhanced chip-removal from the head 4".

Preferably, each forward facing front cutting portion 6" has generally concave fillets 13" arranged on both sides of the front cutting portion where it attaches to the shank 2", to provide further enhanced chip-removal from the head 4".

The shank 2" advantageously has a diameter which is smaller than the diameter of the post 3", to facilitate sideways movement and tilting of the head 4" in a drilled hole, without the post or the shank making contact with surfaces of the hole.

Figure 4B:
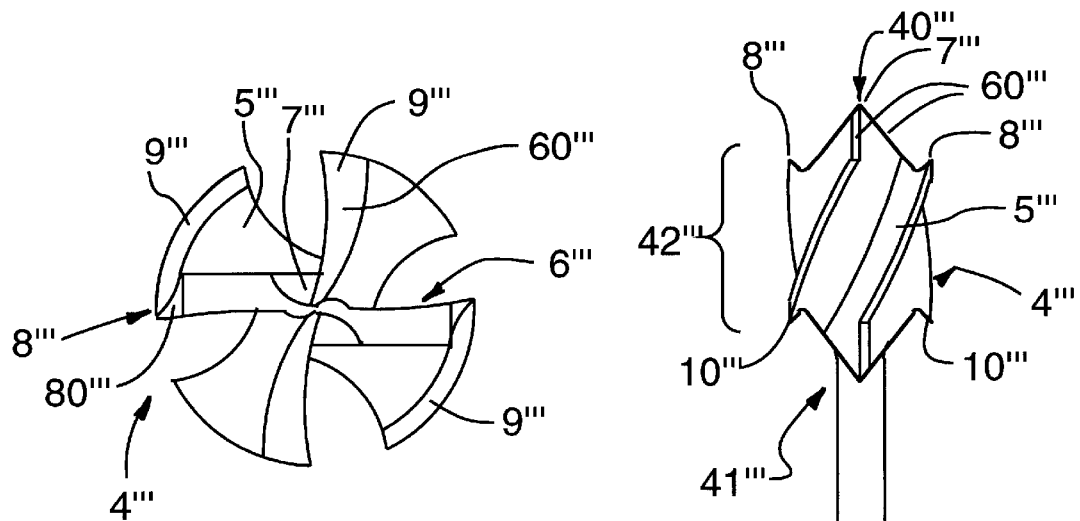
FIG. 4B is a front view of the drill bit of FIG. 4A.
Figures 4A, 4C:
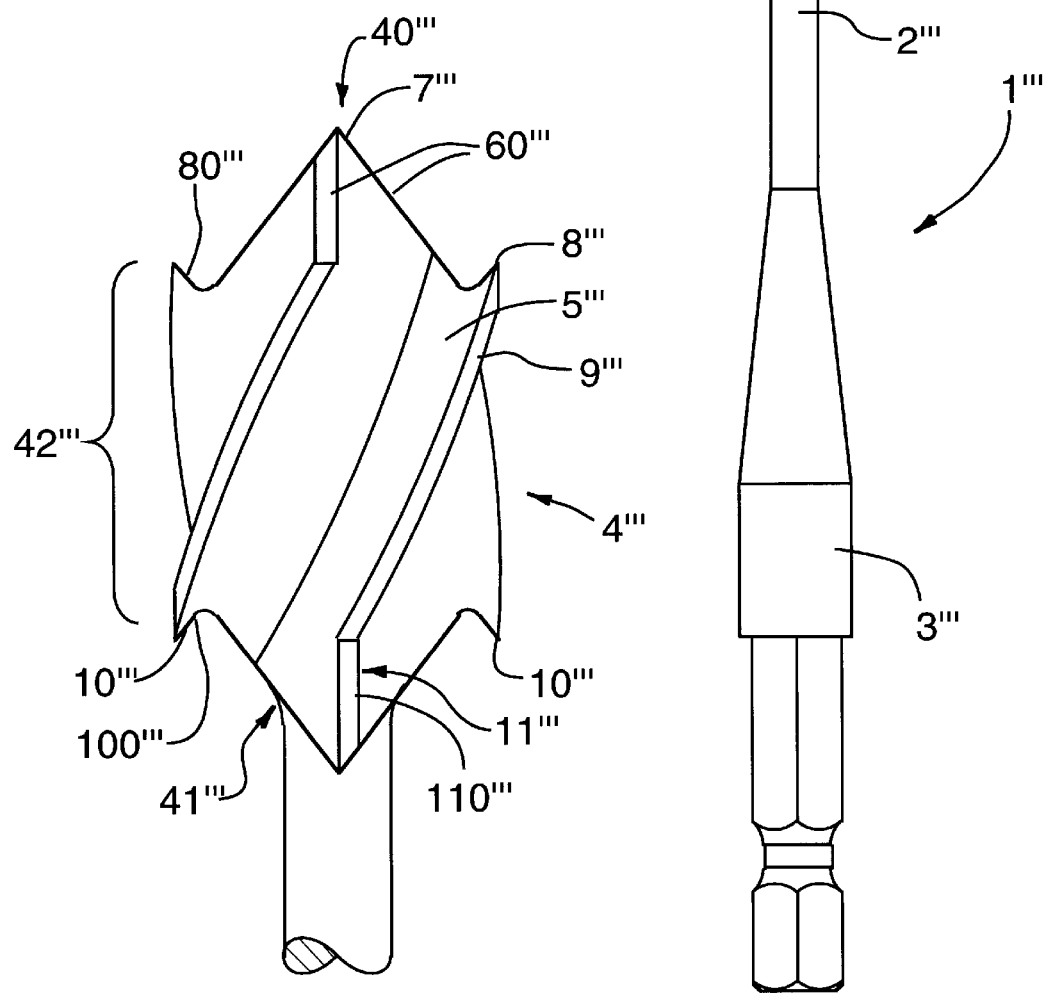
FIG. 4A is an elevational side view of a drill bit in accordance with yet a further embodiment of the invention.
FIG. 4C is a side view of the drill bit head of FIG. 4A.

A fourth embodiment of the invention is shown in FIGS. 4A to 4C. A drill bit 1''' for boring either non-linear holes or linear holes in a workpiece (not shown) has a generally elongate post 3''', for mounting the drill bit to a hand tool or a power tool. The drill bit has a generally elongate shank 2''' and a head 4'''. The shank is arranged as a continuation of the post, and the head is arranged at an end of the shank opposite the post. The head 4''' has a front portion 40''', a rear portion 41''' and there-between a main body portion 43'''. The head further has a plurality of flutes 5''', arranged in a generally helical shape along the shank and the main body portion, arched with respect to a longitudinal direction of the drill bit. Each flute has an outer cutting edge 9''' arranged on an outside edge of each flute, to provide cutting capability in a direction substantially sideways compared to the longitudinal direction of the drill bit. The drill bit further has a central point 7''', arranged on the front portion 40''' of the head 4'''. The central point is connected to at least one of the flutes 5''' via tapered front cutting portions 6''', each of the front cutting portions being provided with a front cutting edge 60''', to provide cutting capability in a direction substantially forwards. The taper of the front cutting portions is chosen to optimize the drill bit capability to drill both forwards and in a lateral direction. At least one of the flutes 5''' further has a forward facing roughing part 8''', arranged at the front portion of the head, i.e. furthest away from the post 3''', the forward roughing part having a forward roughing edge 80''', to provide further cutting capability in a direction substantially forwards. The rear portion 41''' of the head 4''' is connected to at least one of the flutes 5''' via tapered rear cutting portions 11''', each rear cutting portions being provided with a rear cutting edge 110''', to provide cutting capability in a direction substantially rearwards. At least one of the flutes 5''' further has a rearward facing roughing part 10''', arranged at the rear portion of the head, i.e. closest to the post 3''', the rearward roughing part having a rearward roughing edge 100''', to provide further cutting capability in a direction substantially rearwards in the drilled hole. In this embodiment, every other flute has a forward roughing part 8''' and the other flutes have a rearward roughing part 10'''.

Figure 5:
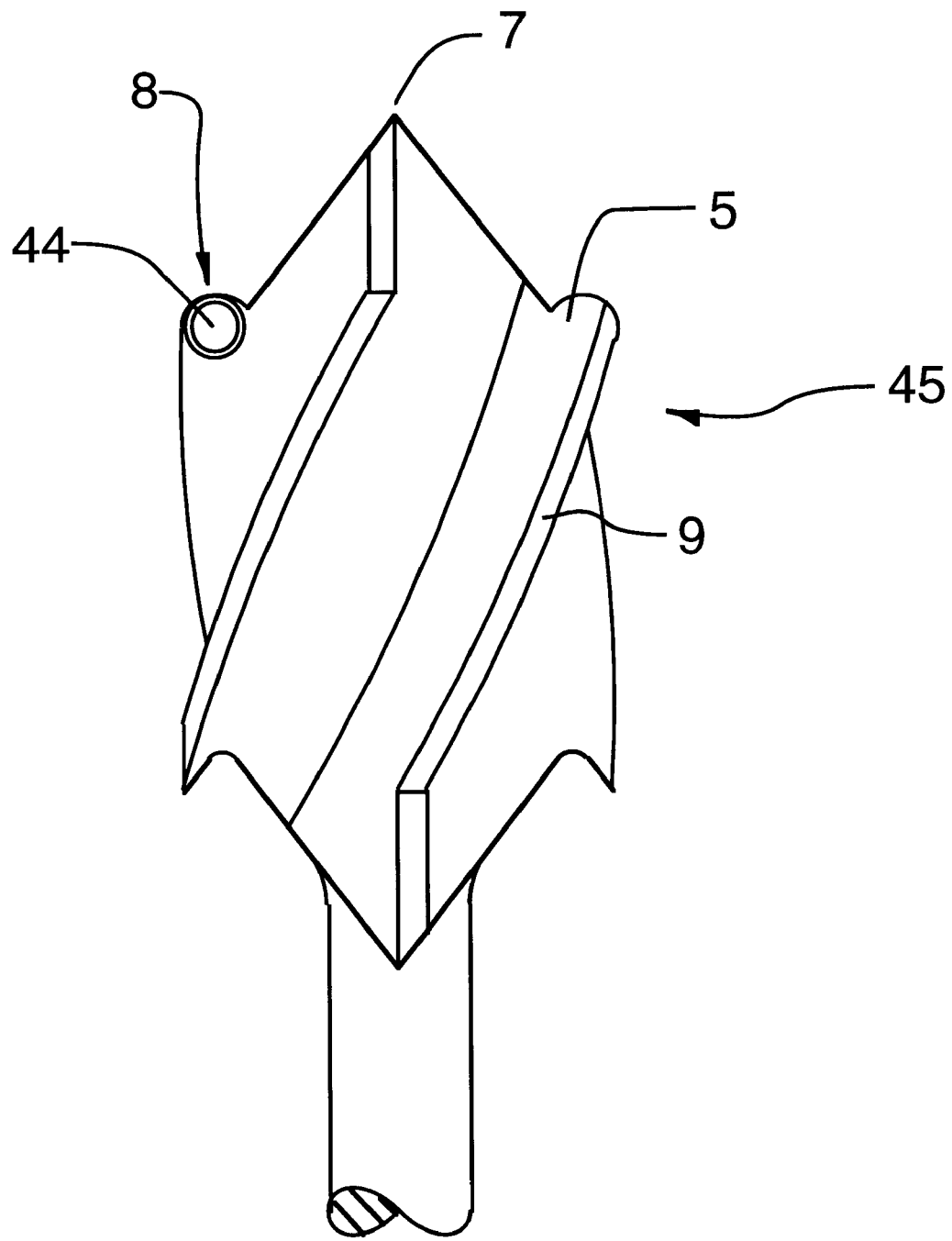
FIG. 5 is a side view of a drill bit head in accordance with a still further embodiment of the invention.

A fifth embodiment of the invention is shown in FIG. 5. A drill bit head 45 on a shank 2 has flutes 5 with an outer cutting edge 9, as previously described. The drill bit head further has a central point 7 and forward roughing parts 8, arranged as described earlier on at least one flute. A dimple 44 is arranged on a side of the forward roughing part which contacts the workpiece material (not shown) during a cutting operation. The dimple facilitates cutting by breaking up the cuttings into smaller pieces. Naturally, the dimple might also be used for a corresponding rearward roughing part, as described for earlier embodiments.

Figure 1F:
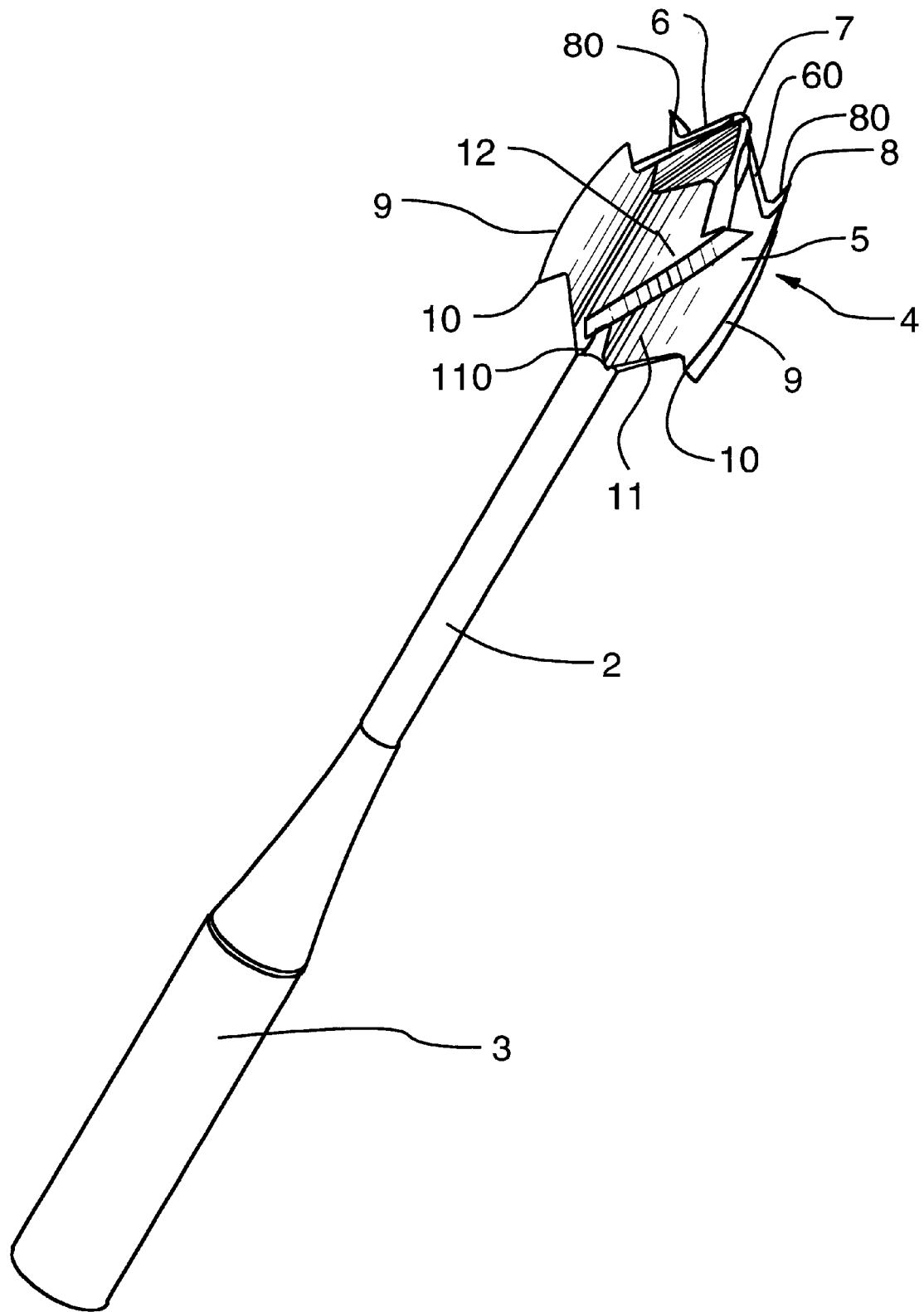
FIG. 1F is an elevational side view of the drill bit of FIG. 1A, showing an alternative post arrangement.

A first embodiment of a post 3 according to the invention is shown in FIGS. 1A and 4A. A second embodiment of a post 3 according to the invention is shown in FIG. 1F, a substantially cylindrical post. A third embodiment of a post 3' according to the invention is shown in FIGS. 2A, 3A, 7A and 7B, a substantially cylindrical post having three flat portions 48 arranged in the longitudinal direction of the post. A fourth embodiment of a post 30 according to the invention is shown in FIGS. 6A and 6B, a substantially cylindrical post having two opposed flat portions 46 arranged in the longitudinal direction of the post. The opposed flat portions 46 have notches 47 arranged opposite each other, for cooperation with a locking element (not shown) in a drill chuck (not shown).

It will be appreciated that the above description relates to the preferred embodiment by way of example only. Many variations on the invention will be obvious to those knowledgeable in the field, and such obvious variations are within the scope of the invention as described and claimed, whether or not expressly described. For example, the number of flutes is preferably even, with the flutes arranged in pairs opposite each-other on the shank, to minimize vibration of the drill bit during operation. If a large number of flutes is used, for example more than six, it is possible to have an odd number of flutes, because of the numerous individual impacts of cutting edges in the drilled hole smoothing out any vibrations caused by the un-symmetrical arrangement of flutes on the shank.

What is claimed as the invention is:

1. In a drill bit for boring holes in a workpiece, said drill bit comprising:
    a generally elongate shank; and
    a head at a distal end of said shank, said head having a front portion, a rear portion and there-between a main body portion, said head comprising:
        a plurality of flutes, arranged in a generally helical manner along said main body portion and extending radially outwardly therefrom, each said flute having an outer cutting edge, to provide cutting capability in a direction substantially sideways compared to a longitudinal direction of said drill;
        a central point, arranged on said front portion of said head, said central point being connected to at least one of said plurality of flutes via a tapered front cutting portion, said front cutting portion having a front cutting edge, to provide cutting capability in a substantially forwards direction;
        a forward facing roughing part, arranged at an outer portion on at least one of said plurality of flutes, on said front portion of said head, said forward roughing part having a forward roughing edge, to provide further cutting capability in a substantially forwards direction;
        said rear portion of said head being connected to at least one of said plurality of flutes via a rear cutting portion, said rear cutting portion being provided with a rear cutting edge, to provide cutting capability in a substantially rearwards direction, said head having a rearward facing roughing part, arranged at an outer portion on at least one of said plurality of flutes, on said rear portion of said head, said rearward roughing part having a rearward roughing edge, to provide further cutting capability in a substantially rearwards direction.

2. A drill bit as recited in claim 1, wherein said outer cutting edges are helically curved with respect to said longitudinal direction of said drill bit.

3. A drill bit as recited in claim 1, wherein said outer cutting edges have serrations arranged along at least a portion of their length.

4. A drill bit as recited in claim 1, wherein said rear cutting portion is tapered from said shank to an outer portion of said rear portion of said head.

5. A drill bit as recited in claim 1, wherein said plurality of flutes have generally concave fillets arranged on both sides of said plurality of flutes where they attach to said shank, to provide enhanced chip-removal from said head.

6. A drill bit as recited in claim 5, wherein each said forward facing front cutting portion has generally concave fillets arranged on both sides of said forward facing front cutting portion where it attaches to said shank, to provide further enhanced chip-removal from said head.

7. A drill bit as recited in claim 1, wherein said shank has a proximal end which is larger in diameter than a central portion thereof, for mounting in a drill chuck while minimizing the diameter of said central portion, to facilitate sideways movement and tilting of said head in a drilled hole, without said proximal end making contact with surfaces of the hole.

8. A drill bit as recited in claim 1, wherein said forward facing roughing part has a dimple arranged on a side of said forward facing roughing part which contacts said workpiece during drilling, to facilitate chip-removal and break-up from said head.

9. A drill bit as recited in claim 1, wherein said rearward facing roughing part has a dimple arranged on a side of said rearward facing roughing part which contacts said workpiece during drilling, to facilitate chip-removal and break-up from said head.

10. A drill bit as recited in claim 7, wherein said proximal end has at least one profiled surface for cooperation with a locking element of said chuck.

11. A drill bit as recited in claim 10, wherein said at least one profiled surface has a hex cross-section and a circumferential groove for cooperation with said locking element.

12. A drill bit as recited in claim 10, wherein said at least one profiled surface has a substantially triangular cross-section.

13. A drill bit as recited in claim 10, wherein said at least one profiled surface has flat portions and grooves arranged on each of said flat portion for cooperation with said locking element.

* * * * *